United States Patent Office 3,395,133
Patented July 30, 1968

3,395,133
ACRYLONITRILE POLYMERIZATION IN THE PRESENCE OF ION-EXCHANGE RESIN HAVING —SO₃H GROUPS
Gaetano F. D'Alelio, South Bend, Ind., assignor of twenty-five percent to Walter J. Monacelli, Cleveland, Ohio
No Drawing. Continuation-in-part of application Ser. No. 249,342, Jan. 4, 1963. This application Aug. 8, 1966, Ser. No. 570,744
10 Claims. (Cl. 260—88.7)

ABSTRACT OF THE DISCLOSURE

This invention comprises an improved process for the production of substantially colorless polymers of acrylonitrile by polymerization in organic solvents capable of dissolving polymers containing at least 60% of acrylonitrile and even 80% or more acrylonitrile, this polymerization being effected by free radical mechanism in the presence of an insoluble, isolable, infusible ion-exchange resin having —SO₃H groups therein. Removal of the ion-exchange resin leaves a solution of colorless acrylonitrile polymer that is resistant to discoloration after spinning or shaping into fibers or film, etc., even upon aging or heating, such as for example at 150° C.

This application is a continuation-in-part of pending application Ser. No. 249,342, filed Jan. 4, 1963, now abandoned.

This invention relates to an improved method for solution polymerization of acrylonitrile. More specifically it relates to a method of polymerizing acrylonitrile in various organic solvents in which acrylonitrile polymers containing at least 60% acrylonitrile, and even containing 80% acrylonitrile or more, are soluble. Still more particularly, this improved process results in the production of substantially colorless acrylonitrile polymer solutions from which substantially colorless films and fibers can be cast or spun.

The current commercial method of producing acrylic fibers comprise a number of expensive steps. Usually, acrylonitrile, alone or with one or more comonomers is polymerized in a water solution or emulsion from which the polymer is removed by filtration, washed, dried, ground or milled and finally dissolved in a solvent, then refiltered to give a dope containing about 15% of the polymer which is extruded into fibers by either wet or dry spinning methods.

In order to avoid the additional steps of recovering polymer and then dissolving the separated polymer in a solvent to prepare the polymer solutions for spinning, it is desirable to prepare the polymer in situ by polymerizing the acrylonitrile, together with any desired comonomers, in the solvent and to use the resultant solution of the polymer directly as the spinning solution. However, such a process has not been considered feasible for a number of reasons, such as the high radical-transfer coefficient of the types of solvents usually required to dissolve the polymers.

Furthermore, prior to the present invention, it has been found impractical to conduct the acrylonitrile polymerizations in suitable solvents since color formation results (1) during the solution polymerization and/or (2) on drying the polymer spun or case from solution and/or (3) heat treating the dried polymer.

The presence of initial color in the acrylonitrile polymers is highly undesirable since this interferes with subsequent application of dyes. Where light colored dyes are to be applied, the results are entirely unsatisfactory when color is present in the original polymer. While some small amounts of color can be tolerated or compensated for when dark colored dyes are to be applied, substantial amounts of color are highly undesirable since they cause somewhat erratic dyeing in view of the variations of color in the polymer and also because corresponding degrees of dyeing in such cases are difficult to reproduce. Moreover, the adjustment for this initial color in the polymer is highly unsatisfactory in that more careful control and inspection in the application of the dye are required; and even in such cases the color matches are poor.

On the other hand, when the color of the original fiber is very light but discoloration occurs during further drying or heat pressing or ironing, the value of the fibers or the textile produced therefrom is greatly reduced. Therefore, it is highly desirable that the acrylonitrile polymer be produced in a colorless or, at most, a practically colorless condition. Heretofore this has not been possible in the desired technique of preparing the acrylonitrile polymer in situ by solution polymerization. It is also important that the heat stability of the acrylic polymers and copolymers obtained during the polymerization, whatever their original color, possess the highest resistance to thermal discoloration.

It is an object of this invention, therefore, to produce substantially colorless solutions of acrylonitrile polymers and copolymers which can be spun or extruded into desired shapes and to produce polymers of improved thermal resistance to discoloration. Other objectives of this invention will become apparent as the description of the invention proceeds.

The objectives of this invention are achieved by the preparation of polymers of acrylonitrile containing at least 60 and preferably 80% acrylonitrile by means of solution polymerization, in the presence of isolable, insoluble, infusible sulfonated ion exchange resins, of a solution containing 20–50%, preferably 26–35% by weight of acrylonitrile, together with any comonomer or comonomers, based on the total weight of the solution, at a temperature in the range of 30–60° C., preferably 40–50° C., until a conversion of at least 10%, preferably at least 30–40% or more of monomer to polymer having an average molecular weight of at least about 50,000 has been effected. The ion exchange resin is more fully described hereinafter.

While the time necessary to effect such minimum conversion depends somewhat on the temperature, the amount of catalyst and the concentration of monomer, satisfactory results generally are obtained within a reaction time of 10–50 hours.

It is desirable in preparing acrylonitrile polymer and copolymer solutions that such solutions be ungelled. In solution polymerization it has been found that when substantial amounts of monomer have been converted to polymer, gelation or precipitation of the polymer occurs. The term "gelation" as used herein means that a solution has become so viscous that there is no free flow. In such cases, prolonged heating and agitation are required to reconvert the gel to a flowable solution.

The degree of conversion of monomer to polymer at which gelation or precipitation occurs, will vary according to the particular solvent being used, the temperature of the solution, and the presence of any comonomers which tend to make the resultant polymer more soluble. With all other factors equal, homopolymers of acrylonitrile will reach gelation at a lower degree of conversion than in the case of acrylonitrile copolymers. With comonomers which contribute to the solubility of the copolymers, a higher degree of conversion can be effected before gelation is reached. Likewise, as the amount of comonomer contributing to solubility is increased, a greater degree of conversion is permitted before gelation.

The following table illustrates the effect of additional amounts of methyl acrylate as comonomer in permitting higher degrees of conversion before gelation occurs. In a series of experiments in which various factors such as temperature, percent by weight of total monomer portion to dimethyl formamide solvent, amount of initiator, etc., are maintained constant, the following table illustrates how a higher degree of conversion is permitted by increasing the proportion of methyl acrylate as comonomer.

TABLE I

| Parts Acrylonitrile | Parts Methyl Acrylate | Percent Conversion at Gelation |
|---|---|---|
| 100 | 0 | 22 |
| 95 | 5 | 30 |
| 90 | 10 | 50 |
| 85 | 15 | 70 |

However, since the properties of the polymer are affected by the amount of comonomers present, the use of comonomer to permit increased conversion is limited. If dilute solutions of the monomer portion are used in order to permit higher degrees of conversion, the molecular weights are adversely affected. Acrylonitrile polymers having molecular weights below about 30,000 generally are not spinnable. At molecular weights of about 35,000, the polymers are spinnable but cannot be stretched uniformly without breaking. Above molecular weights of 35,000 spinnability and stretchability are improved and the elongation, tensile strength, loop strength, etc. of the spun fiber increase gradually with increased molecular weight of the polymer. Generally molecular weights above 40,000 and for most commercial purposes, molecular weights above 50,000 are preferred.

Therefore, in order to produce acrylonitrile polymers of a desired molecular weight, it is necessary to avoid the use of dilute solutions of the monomer portion. Generally, the lower limit of monomer concentration is that which will permit production of the desired molecular weight, and the upper limit is determined according to the degree of conversion that will cause gelation.

When the degree of conversion that can be tolerated in a certain polymerization system is being approached, the addition of acrylonitrile monomer or even other monomer, or other non-solvent materials, will cause precipitation of the polymer.

The above molecular weights are average molecular weights. When polymerization is started, a higher concentration of monomer is present. Therefore the polymers produced at that time have a relatively higher molecular weight than are produced in later stages of the polymerization. For example, for a particular polymerization in which the product has an average molecular weight of 50,000, a polymer produced at the beginning of the polymerization may have a molecular weight of 70,000–80,000. Then at the end of the polymerization, depending upon what degree of conversion is attained, the molecular weight may be 20,000 or even lower. Therefore, if dilute solutions of monomers are used initially, there is a shift downward through the whole molecular weight range, thereby making it necessary to stop the polymerization at a low degree of conversion in order to obtain an average molecular weight in the desired range.

Very often it would be desirable to add initiator at later stages of polymerization to continue polymerization and also to shorten polymerization time in reaching the desired degree of conversion. As the initiator is used up there are fewer free radicals generated. However, if larger amounts of initiator are added at the beginning of the polymerization, this larger amount contributes to the production of lower molecular weight polymers. Where it would be desirable to add additional amounts of initiator in later stages of the polymerization, as pointed out above, the initiator is a non-solvent material and therefore such addition when the degree of conversion of monomer to polymer is approaching the maximum that can be tolerated in the solution, will cause precipitation or gelation.

Moreover, the monomer portion, including both the acrylonitrile monomer and any comonomers, is a non-solvent for acrylonitrile polymers having about 80% or more of acrylonitrile therein. Therefore, the proportion of monomer to solvent that can be used in a solution polymerization system is also limited. In addition to this effect of monomer on the solubility characteristics of solution polymerization, it is desirable also to remove unconverted monomers before spinning since its presence introduces a somewhat variable factor in the spinning operation. If the polymer solution is to be stored before spinning, it is likewise important to remove unconverted monomer since polymerization may continue with resultant gelation during storage. Therefore, it is desirable to have as high a degree of conversion as possible without adversely affecting the polymer properties in order to reduce the amount of monomer that needs to be removed and thereby the cost of such removal.

For example, a solution of 0.5 part of polyacrylonitrile in 100 parts of dimethyl formamide can tolerate the addition of 100 parts of acetone without precipitation of the polymer. However, if a second addition of 10 parts of acetone is made, the polymer will precipitate.

In another case, if a solution of 3 parts of polyacrylonitrile in 97 parts of dimethyl formamide has 15 parts of acetone added thereto, the polymer is precipitated.

In another instance, a solution containing 5 parts of polyacrylonitrile in 95 parts of dimethyl formamide has polymer precipitated when 5 parts of acetone are added.

For a solution of 22 parts of polyacrylonitrile in 100 parts of dimethyl formamide, 1 part of acetone is more than enough to precipitate the polymer.

In corresponding experiments using acrylonitrile monomer in place of the acetone, similar results are obtained. For example, with a solution of 0.5 part of polyacrylonitrile in 78 parts of dimethyl formamide, the addition of 78 parts of monomer does not precipitate the polymer. However, a total of 110 parts of monomer will precipitate the polymer.

It appears that the maximum concentration of polyacrylonitrile in dimethyl formamide is approximately 22 percent by weight at 50° C. This means that if polymerization is conducted at 50° C. with 30% acrylonitrile in dimethyl formamide, gelation or precipitation of polymer will occur when about 50% of the monomer has been converted to polymer because of the presence of the unconverted monomer.

It is undesirable to carry the polymerization to such a high degree of conversion that there is a risk of causing gelation. Once gelation has occurred, it is a difficult, time-consuming and expensive operation to heat and stir the resultant gel in order to get it back into workable solution. In order to avoid this, solution polymerizations are generally carried only to a degree of conversion that is a safe distance away from the gelation point.

The foregoing disadvantages are overcome when the solution polymerization is initiated under the various conditions most favorable toward obtaining the desired molecular weight and thereafter adding solvent in one or more increments, with or without additional initiator prior to the gelation stage. The amount of solvent to be added by such incremental addition will vary according to the particular polymerization system and the results desired. For example, the more insoluble the resultant polymer and the greater degree of conversions desired, the smaller will be the amount of solvent added in each increment and the greater will be the number of incremental additions. In contrast, the more soluble the polymer and the lower the degree of conversion required, the greater will be the amount of solvent that can be added per increment and the fewer such additions will be necessary.

Any solvent which will dissolve acrylonitrile polymers having at least 80% acrylonitrile therein can be used in the practice of this invention. It is only necessary that the solvent is a liquid at the temperature at which polymerization is conducted and that the solvent is reasonably stable under polymerization conditions. Any number of such solvents have been disclosed in Patents Nos. 2,407,714 through 2,407,727 inclusive. Typical of these solvents which can be used in the practice of this invention, include but are not restricted to the following:

N,N,N',N'-tetramethyl-alpha-ethylamalonamide;
N,N,N',N'-tetramethylglutaramide;
N,N,N',N'-tetramethylsuccinamide;
Thiobis-(N,N-dimethylacetamide);
Bio(N,N-dimethylcarbamylmethyl) ether;
N,N,N',N'-tetramethylfumaramide;
Methylsuccinonitrile;
1,2,3-tricyanopropane;
Alpha-ethylsuccinonitrile;
Succinonitrile;
N,N-dimethylcyanoacetamide;
N,N-dimethyl-beta-cyano-propionamide;
Dimethylester of methane disulfonic acid;
Diethylester of ethane-1,2-disulfonic acid;
Bis-(cyanomethyl)-sulfone;
1,2-dithiocyanopropane;
Bis-(thiocyanomethyl) ether;
Beta-thiocyanoisobutyronitrile;
5-hydroxy-2-piperidone;
3-hydroxy-2-pyrrolidone;
N-formyl-piperidine;
N-formyl-pyrrolidone;
2,2',2,2'-tetra-amino-5,5'-dimethyl-diphenylmethane;
Nitronaphthol;
Dimethyl sulfoxide;
Tetramethylene sulfoxide;
Pentamethylene sulfone;
N,N-bis-(cyanomethyl)formamide;
N,N'-diformyl-piperazine;
N,N-dimethylmethoxyacetamide;
N,N-dimethylcyanamide;
Glycolonitrile;
Hydracrylonitrile;
Malonitrile.

Any free radical generating initiator or catalyst suitable for polymerization of acrylonitrile by solution polymerization is suitable for the practice of this invention. The amount of such initiator or catalyst used at the beginning of the polymerization is the amount normally used for solution polymerization. The preferred types of catalyst are per- and azo- catalysts. Typical catalysts suitable for the purpose of this invention, include but are not restricted to the following: various persulfate compounds such as potassium persulfate, sodium persulfate, etc.; various peroxy compounds such as benzoyl peroxide, acetyl peroxide, lauryl peroxide, phthalyl peroxide, tetrahydrophthalyl peroxide, succinyl peroxide, naphthyl peroxide, t-butyl perbenzoate, hydrogen peroxide, ditertiary butyl diperphthalate, acetyl-benzoyl peroxide, etc., 2,2'-azo-bisisobutyronitrile, etc. When such initiators are added in the solvent additions there is advantageously at least about 0.05% based on the weight of monomer and preferably between 0.1 and 1.0%. Larger amounts, even up to 5%, can be used provided that the resultant lower molecular weight of the polymer is desired or can be tolerated.

In preparing acrylonitrile polymers for spinning into fiber, or for forming film, or for various other uses for which solutions of acrylonitrile polymers can be used, it is generally desirable to have present in the polymer at least 0.1 and as much as 15% of one or more comonomers which improve the solubility and dyeability characteristics of the acrylonitrile polymer and to facilitate processing of the polymer solution and the ultimate shaped article. Various typical comonomers which have been found useful for this purpose are listed hereinafter.

Of particular usefulness for improving the solubility characteristics are the methyl, ethyl, propyl and isopropyl acrylates. In the present invention methyl and ethyl acrylates are preferred because they are inexpensive, easily available, polymerize easily with the acrylonitrile and with other comonomers, etc. Most important, however, is the fact that the methyl and ethyl acrylates have polymerization rates close to the ideal polymerization rate for effecting a uniform composition in the resultant copolymer. In other words, their polymerization rates are close to that for acrylonitrile and, therefore, the two monomers copolymerize in such a manner as to give a substantially uniform copolymer composition.

Typical preferred comonomers for improving the solubility include the following, which can be used individually or in combination of two, three or more comonomers: methyl acrylate and its homologs, namely the ethyl, propyl, butyl and amyl acrylates; the corresponding methacrylates, namely methyl, ethyl, propyl, butyl, and amyl methacrylates; vinyl acetate, vinyl propionate, vinyl butyrate, vinyl valerate; dialkyl itaconates, maleates and fumarates, the alkyl groups being similar or different and preferably lower alkyl groups, i.e. containing no more than 5 carbon atoms, such as dimethyl itaconate, diethyl maleate, methyl amyl itaconate, ethyl butyl fumarate, diamyl itaconate, etc.; vinyl chloride, vinylidene chloride, vinylidene cyanide, alpha-methacrylonitrile, alpha-acetoxy-acrylonitrile, vinyl aryl compounds, such as styrene, vinyl naphthalene, and vinyl diphenyl, the corresponding alpha-methyl derivatives, and the nuclear-substituted derivatives thereof in which the nuclear substituents are chlorine, fluorine, acetoxy, and alkyl groups, said alkyl and acetoxy groups preferably having no more than 5 carbon atoms therein. Such substituted vinyl aryl compounds can have one or more substituent groups of the type indicated thereon, either of the same or different types, but it is generally preferred that no more than two such substituent groups be attached to an aromatic nucleus.

Typical examples of such substituted vinyl aryl comonomers are:

vinyl toluene,
ethyl styrene,
propyl styrene,
butyl styrene,
amyl styrene,
dimethyl styrene,
diethyl styrene,
methyl ethyl styrene,
methyl amyl styrene,
chloro styrene,
fluoro styrene,
dichloro styrene,
dicluoro styrene,
methyl chloro styrene,
methyl fluoro styrene,
trifluoromethyl styrene,
acetoxy styrene,
acetoxy-methyl styrene,
chloro acetoxy styrene,
vinyl methyl naphthalene,
vinyl chloro naphthalene,
vinyl fluoro naphthalene,
vinyl ethyl naphthalene,
vinyl dimethyl naphthalene,
vinyl diethyl naphthalene,
vinyl methyl-chloro naphthalene,
vinyl amyl naphthalene,
vinyl methyl butyl naphthalene,
vinyl acetoxy naphthalene,
alpha-methyl-styrene,
alpha-methyl-vinyl toluene,
alpha-methyl-vinyl ethyl benzene,
alpha-methyl-vinyl chloro benzene, alpha-methyl-vinyl methyl naphthalene,
alpha-methyl-vinyl chloro toluene,
alpha-methyl-vinyl acetoxy naphthalene,
alpha-methyl-vinyl diphenyl,
isopropenyl methyl diphenyl,
isopropenyl chloro diphenyl,
isopropenyl methyl diphenyl,
isopropenyl dimethyl diphenyl,
isopropenyl butyl diphenyl, etc.

While the above comonomers are particularly preferred for forming more soluble and more easily workable acrylonitrile copolymers, various other comonomers can be used in preparing copolymers of acrylonitrile in accordance with the practice of this invention, including higher alkyl derivatives of the various esters and vinyl aryl compounds listed above, as well as corresponding aryl and cycloalkyl derivatives. Various other comonomers, such as acrylamides and methacrylamides, both unsubstituted and substituted with various alkyl aromatic and cycloalkyl groups, as well as various other comonomers shown in the prior art can also be used.

Any reasonably accurate method of determining molecular weight can be used. However, the method used in determining molecular weights in the above examples is as follows: a solution of about 0.5% by weight of polymer or copolymer is made in dimethyl formamide, and the viscosity measured at 20° C. in an Ostwald Viscometer, and recorded at $t_s$, the time of flow in minutes. The time of flow in minutes, $t_o$, for the pure dimethyl formamide solvent is also measured; and the specific viscosity $\eta_{sp}$ is given as $(t_s-t_o)/t_o$ from which the molecular weight is calculated from the relationship $\eta_{sp}=M \cdot K \cdot C$, wherein K has a value of $1.5 \times 10^{-4}$. C equals the number of grams of polymer per liter divided by the molecular weight of acrylonitrile, and M is the molecular weight.

The percent of polymer conversion is easily determined by weighing out a quantity of polymer solution in a small beaker, allowing the great portion of the solvent and unconverted monomer to evaporate, to form a film, then drying to constant weight and thereafter weighing the dried polymer film. Knowing the original proportion of monomer in the solution, and the weight of dried film dried from a given weight of solution, it is possible to determine the percent of polymer resulting from the starting amount of monomer. Alternately the polymer solution may be precipitated, as for example, with water, the polymer isolated by filtration and dried to constant weight and the conversion calculated.

In most cases it is desirable to perform polymerization of acrylonitrile and mixtures thereof with various comonomers in an oxygen-free or inert atmosphere. In such cases inert gases such as nitrogen, carbon dioxide, neon, helium, hydrogen and methane are particularly suitable as inert blanketing media for this purpose.

The process of this invention lends itself very conveniently to continuous operation as well as batch polymerization and spinning. In continuous operation, the residence time for effecting polymerization in the proper temperature zone can be controlled by adjusting the flow rate of the polymerization solution in accordance with the size of the vessel or zone in which the temperature is properly maintained for effecting polymerization.

The resultant polymer solution can then be flowed directly into the spinning apparatus or can be cooled to retard further polymerization and and thus stored until desired for spinning. However, a preferred procedure is to remove unpolymerized monomer from the solutions by distillation processes and the resulting stable solution used directly or stored for future use. Alternately, the solution can be allowed to polymerize to high conversion simultaneously with further addition of solvent with or without more initiator until substantially a 100% conversion is obtained.

In the present invention, the polymerization is performed, at least initially, in the presence of an ion exchange resin as described hereinafter, till at least about 10% and preferably 20% of the monomer has polymerized, up to complete conversion of the monomer to polymer, if desired. The polymerization may be performed in a single reactor, with or without agitation, or in a series of reactors, with or without agitation in each reactor. For example, the first stage can be performed in an agitated reactor until 15-20% conversion is achieved, and the second stage can be performed in a column type reactor without agitation and without or with packing, such as glass beads, Rachig rings, etc. in which case the packing can comprise cation exchange resin in bead or granular form to function also as part of the packing. The spinning techniques and further processing and use of the polymers of this invention can be effected in accordance with standard procedures used for such processes and products.

The ion exchange resins used in the practice of this invention are insoluble crosslinked sulfonated polymers, having free —SO₃H group, preferably attached directly to an aromatic ring such as the benzene, toluene, etc. rings. The ion-exchange resins used for this purpose must be insoluble so as to be easily separated from the solution of the acrylonitrile polymer. Otherwise if the ion-exchange resin is soluble and thereby retained in the acrylonitrile polymer it will eventually cause discoloration, particularly upon heat treatment of the final product.

One of the best known cation exchange resins is the class of sulfonated aminoalkenyl-polyalkenyl copolymers, such as the sulfonated styrenedivinyl benzene copolymer described in my U.S. Patent 2,366,007, December 26, 1944. Other cation exchange resins which can be used in the practice of this invention are disclosed in my U.S. Patents 2,366,007, December 26, 1944; 2,628,193, February 10, 1953; 2,631,127, March 10, 1953; 2,644,801, July 7, 1953; 2,645,621, July 14, 1953; 2,684,387, August 24, 1954; as well as the earlier known phenol-sulfonic acid-aldehyde type cation exchange resins. Other classes of sulfonic acid type cation exchange resin can be used, such as those disclosed in my U.S. Patent 3,068,190, issued December 11, 1962, derived from the condensation of aldehydes and triazines containing an aldehyde reactable group and sulfonated aryl group attached to the triazine ring. Though the sulfonic group, —SO₃H, in the resins used in the practice of this invention is preferably attached directly to an aromatic structure, it can be attached to an aliphatic moiety such as in the crosslinked copolymers of vinyl sulfonic acid

or vinyl benzyl sulfonic acid,

etc., though such polymers are less desirable and more expansive than those in which the —SO₃H group is attached to an aromatic ring.

In the practice of this invention, the polymers are prepared in solution in the presence of the insoluble, crosslinked sulfonic acid type polymer and before isolation of the polymer such as by spinning, casting or precipitation, the ion exchange resin is completely removed from the polymer. The ion exchange resins used in the practice of this invention are preferably in a form which permits their removal from the reaction mixture by filtration or by centrifuging, or as a fixed bed in a reactor vessel or a column. These ion exchange resins can be in the form of beads, granules, ground powders, films, filaments, or fibers, etc. These insoluble, crosslinked sulfonated cation exchange resins, used in the practice of this invention, are ineffective when the —SO₃H group is neutralized, such as when their K, Li, Na, Ca and Mg salts are used, and also actually induced more color when their ammonium and amine salts are used. It is a requirement, therefore, that a substantial amount, that is, 10–25% or more of the sulfonic groups be in the hydrogen or acid form, —SO₃H.

Normally, the commercial resins are more readily available in the salt form, —SO₃Na, from which the free acid is readily regenerated by treatment with inorganic acid by well-known procedures.

The use of cation exchange resins containing free —SO₃H groups in the preparation of the polymers of this invention, is not equivalent to, and is not to be confused with, the addition of free $H_2SO_4$ to the polymer solution; nor is it equivalent to the addition of other inorganic acids such as HCl, $H_3PO_4$, etc. The reason for this is not completely understood, but it may be that the free acids react in small amounts with the acrylonitrile or its polymer to give either colored derivatives, or colorless derivatives which, under the influence of moderate or high temperatures, decompose to produce colored derivatives.

The sulfonated cation exchange resins differ markedly from the free acid since the free acid also influences the polymerization unfavorably by lowering its rate and decreasing the molecular weight in proportion to the amount of sulfuric acid used, and at higher concentration cause serious color formation, as compared to solution from which the acid is omitted. On the other hand, there is substantially no decrease in polymerization rate or molecular weight when an equivalent or excess weight of ion exchange resin is used. Moreover the presence of the sulfonated cation exchange resin has the added benefit of providing a marked improvement in freedom from color (1) of the solution, (2) of the initial isolated dried polymer, and (3) of the final polymer even when heated for 30 minutes or even 1 hour at 150° C., as illustrated hereinafter in the examples.

It is advantageous to use at least 0.1 part of said resin per 100 parts of solution. Preferably the ratio of monomer portion to solvent portion in said solution is 30–35:65–70 respectively, in which monomer portion at least 80% by weight is advantageously acrylonitrile.

Generally the degree of sulfonation of the resin is not critical, since larger amounts of resin having a smaller degree of sulfonation can be used in place of smaller amounts of resin having a higher degree of sulfonation. However, for practical purposes, it is desirable to use resins having at least 0.1% by weight of sulfonic acid groups therein, advantageously 1% and preferably at least 3%.

Useful fibers and films can be made from the solutions of the polymers and copolymers of this invention by dry spinning, as in the preparation of cellulose acetate fibers, or by wet spinning, as in the preparation of viscose rayon. In wet spinning, the solution of the polymer or copolymer can be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., may be used as a precipitating bath for dimethyl formamide, N,N-dimethyl acetamide, butyrolactone, ethylene carbonate, dimethyl sulfoxide, and other solvent compositions of these polymers. The extruded fibers, from which substantially all of the solvent has been removed in the spinning step, about 1–10 percent remaining in the shaped article, can then be cold-drawn about 100–900 percent, preferably about 300–600 percent; and the drawn fiber heat-treated, usually at substantially constant length, at about 100–180° C., to effect further crystallization and removal of the remaining solvent. The term "heat-treated," as used herein, refers to the application of heat to an object, usually at a controlled temperature and usually by means of the medium, either liquid or gaseous, surrounding the object.

The invention is best illustrated by the following examples. These examples are intended merely for purposes of illustration and are not to be regarded as limiting the scope of the invention in any way. Except where specifically indicated otherwise in the examples and throughout the specification, parts and percentages are given as parts by weight and percentages by weight. Moreover, unless specifically indicated otherwise, the term "polymer" is intended to include copolymers.

EXAMPLE I

Polymer A

A mixture of:

| | Parts |
|---|---|
| Monomer consisting of 32.9 parts of acrylonitrile and 2.10 parts of methylacrylate | 35 |
| Distilled dimethyl formamide | 65 |
| Azo-bis-isobutyronitrile | 0.4 | are placed in a suitable reactor equipped with stirrer, heating means, etc., the mixture blanketed with deoxygenated nitrogen and polymerized at 50° C. At the end of six hours the conversion is 35.6%, and the average molecular weight of the polymer is 102,500; at the end of 24 hours the conversion is 88.5% and the average molecular weight is 77,300. The color of the solution is light yellow.

Polymer B

The procedure for preparing Polymer A is repeated using the polymerized mixture of

| | Parts |
|---|---|
| Monomer mixture consisting of 32.9 parts of acrylonitrile and 2.1 parts of methylacrylate | 35 |
| Distilled dimethyl formamide | 65 |
| Azoisobutyronitrile | 0.4 |
| $H_2SO_4$ (98%) | 0.15 |

At the end of six hours the conversion is 33.4% and the average molecular weight of the polymer is 98,000; at the end of twenty-four hours the conversion is 84.5% and the average molecular weight is 70,200. The solution has a light yellow tint.

Polymer C

The procedure of Polymer B is repeated using the same mixture of monomers with 0.3 part (98%) $H_2SO_4$ instead of 0.15 part and the conversion at the end of twenty-four hours is 80.3% and the average molecular weight is 62,400. The polymer solution is almost colorless.

Polymer D

The procedure of Polymer B is repeated using 0.6 part of 98% $H_2SO_4$ instead of 0.15 part and the conversion in 24 hours is 71.2% and the molecular weight is 51,300. The polymer solution has a distinct yellow color.

EXAMPLE II

The procedures for Polymers IB, IC, and ID are repeated using a commercial cation exchange resin (Dowex 50) which is sulfonated divinylbenzenestyrene in the hydrogen form in amounts equivalent to the sulfuric acid, namely, 0.3, 0.6 and 1.2 parts respectively of sulfonic resin, and in all cases colorless or substantially colorless solutions are obtained; the conversions and molecular weights obtained at 24 hours are

| Polymer | Parts Ion Exchange Resin | Percent Conversion | Molecular Weight |
|---|---|---|---|
| IIB | 0.3 | 88.4 | 76,900 |
| IIC | 0.6 | 88.2 | 77,100 |
| IID | 1.2 | 88.1 | 77,600 |

EXAMPLE III

Films are cast from the polymer solutions of Examples I and II by first diluting the solutions with dimethyl formamide to 25% polymer solids, filtering the solution and casing the solutions on clean glass plates followed by drying at room temperature for 4 to 6 hours, and a 50° C. for 12 hours. The films are then immersed in two changes of distilled water for 2 hours in each change of water, and then dried in a vacuum oven at 70-80° C. for 8-12 hours, and the color of the films observed and compared. The dried films are then heated in an air oven at 150° C. for 30 minutes and the color of the films observed and compared. In all cases the polymers prepared in the presence of the cation exchange resins are superior in color and heat resistance in comparison with the polymers prepared with sulfuric acid or with soluble polystyrene sulfonated resin or without either acid or cation exchange resin.

When the water washing steps are eliminated from the above procedure the films prepared in the presence of $H_2SO_4$ discolor very badly, exhibiting a brown color, whereas those prepared in the presence of ion exchange resin are colorless.

EXAMPLE IV

Polymer A

A mixture of:

| | Parts |
|---|---|
| Dimethyl formamide (32.9 parts of acrylonitrile and 2.1 parts of methylacrylate) | 65 |
| 2,2'-azobisisobutyronitrile | 0.4 |
| Sodium styrene sulfonate | 0.4 |
| $H_2SO_4$ (98%) | 0.3 | is prepared under an inert atmosphere in a reaction flask and polymerized at 55° C. for 13 hours with a conversion of 50.8% and a molecular weight of 71,000. The solution was light yellow in color, producing colored dried films which discolored on heating.

Polymer B

Part A of this procedure is repeated using 0.6 part of Dowex 50 cation exchange resin in hydrogen form instead of the equivalent 0.3 part sulfuric acid yielding a colorless solution with a conversion of 58.9% and a molecular weight of 76,600; the solution is colorless as are the dried and heated films.

EXAMPLE V

A mixture of:

| | Parts |
|---|---|
| Acrylonitrile | 32.9 |
| Ethylmethacrylate | 2.1 |
| Dimethyl formamide | 65.0 |
| Azoisobutyronitrile | 0.4 |
| Itaconic anhydride | 0.4 |
| Dowex 50 (H form) | 0.6 | and polymerized by the procedure of Example I at 50° C. for 13 hours, yielding a 58.1% conversion with a molecular weight of 62,000; and the solution is colorless. When 0.3 part of soulfuric acid are used instead of the ion exchange resin in this procedure a yellow colored polymer solution is obtained and the conversion, in the same period of time, is reduced to 47.4% and the molecular weight lowered to 54,000.

EXAMPLE VI

A solution of:

| | Parts |
|---|---|
| Acrylonitrile | 20.00 |
| Dimethylformamide | 80.00 |
| Azobisisobutyronitrile | 0.23 |
| Dowex 50 resin in hydrogen form | 0.80 | is heated in a suitable stirred reactor at 50° C. for 11.2 hours and the solution filtered to remove the ion exchange resin, yielding a polymer solution with an 80% conversion, and a polymer molecular weight of 74,300, which is then distilled at 15 mm. pressure to recover 4 parts of acrylonitrile, leaving a clear colorless solution of the polymer in DMF solvent, which can be used as such for the preparation of the films and fibers or which may be concentrated further to higher solids content by removal of DMF under reduced pressure to yield a 22-25% polymer solution.

EXAMPLE VII

This example illustrates the fact that the use of the ion exchange resin is an improvement not only over sulfuric acid, but also over other acids such as HCl, $H_3PO_4$, HCOOH, $CH_3COOH$, etc.

A mixture of:

| | Parts |
|---|---|
| Dimethyl formamide | 260 |
| Acrylonitrile | 131.6 |
| Ethyl methacrylate | 5.4 |
| 2,2'-azobisisobutyronitrile | 1.6 | is prepared and divided into four equal portions, a, b, c, and d, to which is added respectively Part (a)—0.3 part of glacial acetic acid
Part (b)—0.7 part of conc. HCl (36.6%)
Part (c)—0.3 part of HCOOH
Part (d)—1.0 part of $H_3PO_4$ and the mixtures polymerized at 50° C. for 22 hours. In all cases colored solutions were obtained in contrast to polymers obtained when the ion exchange is used in the mixture, as shown in the preceding example.

EXAMPLE VIII

This example illustrates the difference between the use of the ion exchange resins in the practice of this invention and other acids using hydrogen peroxide as a polymerization initiator.

A mixture of:

| | Parts |
|---|---|
| Dimethyl formamide | 175 |
| Acrylonitrile | 70.5 |
| Methylacrylate | 4.5 |
| $H_2O_2$ (90% aq. soln.) | 0.75 | is prepared and divided into five equal portions, a, b, c, d, and e, to which is added respectively the following ingredients, and the mixture polymerized at 50° C. for 10 hours.

| Portion | Substance Added | Conversion, percent | Molecular Weight | Color |
|---|---|---|---|---|
| a | 1 part $H_2SO_4$ | 32 | 41,000 | Light yellow. |
| b | 1 part $H_3PO_4$ | (¹) | | Yellow. |
| c | 1 part $SiCl_4$, 1 part $H_2O$ | 13.5 | 42,100 | Very yellow. |
| d | 1 part $CH_3COOH$ | (¹) | | Yellow. |
| e | 2 parts Dowex 50 acid form | 50.6 | 61,000 | Colorless. |

¹ No polymer.

EXAMPLE IX

A mixture of:

| | Parts |
|---|---|
| Dimethyl sulfoxide | 35 |
| Acrylonitrile | 14 |
| Ethyl acrylonitrile | 1 |
| 2,2'-azobisisobutyronitrile | 0.2 |
| $H_2SO_4$ (98%) | 0.5 | is prepared in an inert atmosphere in a suitable reactor and heated at 50° C. for 21.5 hours yielding a yellow colored solution with a conversion of 70% and a molecular weight of 52,800. When the sulfuric acid is replaced by 1 part of $H_2SO_4$, the color becomes more intense and molecular weight is 49,600 with a conversion of 63.7%. However, when the sulfuric acid is replaced by 1 part of cation exchange resin in acid form, the conversion is 84% in 20 hours and the molecular weight is 79,500.

EXAMPLE X

A mixture of:

| | Parts |
|---|---|
| Dimethyl sulfoxide | 35.0 |
| Acrylonitrile | 14.1 |
| Methyl methacrylate | 0.9 |
| $H_2O_2$* | 0.4 |
| Acetic anhydride* | 1.2 |
| Dowex 50 resin in acid form | 3.0 |

*To yield acetyl peroxide in situ.

is prepared under an inert atmosphere in a suitable reactor and heated at 50° C. for 5 hours to give a colorless solution with a 58.2% conversion and a molecular weight of 92,000. When 3 parts of $H_2SO_4$ are used instead of the ion exchange resin, a yellow colored solution is obtained.

EXAMPLE XI

The procedure of Example X is repeated using 0.2 parts of lauroyl peroxide instead of the acetyl peroxide yielding a 49.2% conversion at 50° C. with a molecular weight of 295,000. The use of $H_2SO_4$ as in Example X instead of the ion exchange resin lowers the molecular weight to 92,000 and the conversion to 42.6% and produces a yellow solution of polymer.

EXAMPLE XII

A mixture of

| | Parts |
|---|---|
| Acrylonitrile | 48.88 |
| Ethyl acrylate | 2.12 |
| Dimethyl formamide | 148.0 | is prepared and divided into three equal portions *a*, *b*, and *c*, to which is added respectively Portion (a)—0.1 part $K_2S_2O_8$+0.5 part Dowex 50 in acid form
Portion (b)—0.05 part $K_2S_2O_8$+0.5 part Dowex 50 in acid form
Portion (c)—0.025 part $K_2S_2O_8$+0.5 part Dowex 50 in acid form in suitable reaction vessels under a deoxygenated nitrogen atmosphere and reacted at 40° C. for 47 hours with the following conversion, molecular weight and color:

| Portion | Conversion, percent | Molecular Weight | Color |
|---|---|---|---|
| a | 58 | 75,000 | Colorless. |
| b | 55 | 78,000 | Do. |
| c | 50 | 89,000 | Do. |

EXAMPLE XIII

A mixture of

| | Parts |
|---|---|
| Dimethyl formamide | 35 |
| Acrylonitrile | 14.1 |
| Propyl acrylate | 0.9 |
| Benzoyl peroxide | 0.5 |
| Dowex 50 resin in acid form | 2.0 | is prepared in a suitable reactor under an inert nitrogen atmosphere and heated at 45° C. for 24 hours, yielding a 95% conversion with a molecular weight of 62,000 in substantially colorless solution. When $H_2SO_4$ is substituted for the ion exchange resin a colored solution of molecular weight of 45,400 is obtained.

EXAMPLE XIV

The procedure of Example XIII is repeated using 0.69 part of tertiary butyl peroxide instead of 0.5 part of benzoyl peroxide. At 29% conversion the molecular weight is 93,300 and the solution is colorless.

Similar results are obtained, also, when the tertiary butyl peroxide is replaced by 0.49 of tertiary butyl hydroperoxide.

EXAMPLE XV

Example I is repeated using instead of dimethyl formamide, 65 parts of dimethyl acetamide and the conversion at the end of 12 hours is 49.8%, and the molecular weight is 76,200; the polymer solution is colorless.

EXAMPLE XVI

Example I is repeated using instead of dimethyl formamide, 65 parts of butyrolactone and the conversion at the end of 14 hours is 50.1% and the molecular weight is 72,480.

EXAMPLE XVII

A mixture of

| | Parts |
|---|---|
| Acrylonitrile | 329 |
| Ethyl acrylate | 21 |
| Dimethyl formamide | 650 |
| 2,2'-azobisisobutyronitrile | 4 |
| Sodium styrene sulfonate | 3 |
| Dowex 50 ion exchange resin (H form beads) | 6 | are reacted in a stirred vessel in a deoxygenated atmosphere at 50° C. for 11 hours to a conversion of approximately 60%, and a polymer molecular weight of 77,100, following which the pressure is reduced to 120 mm. and 143 parts of unreacted monomer, substantially all acrylonitrile, removed by distillation, leaving a solution of 214 parts polymer in 650 parts of solvent. The solution is then filtered to remove the ion exchange resin and is wet spun into a glycerine bath, cold-drawn at a ratio of 8:1, washed with water and dried. Colorless fibers with excellent heat resistance, when heated at 150° C. for 30 minutes, and excellent dyeability are obtained. Similar properties are obtained when the spinning bath consists of a mixture of water and dimethyl formamide, or when the solution is dry-spun.

EXAMPLE XVIII

Example XVII is repeated with the exception that the cation exchange resin is removed from the solution at the end of three hours polymerization time at 50° C. with a conversion of 19.8% and the polymerization continued for an additional 8 hours in the absence of the resin but in a deoxygenated atmosphere. The color of the fibers is almost identical to the fibers of Example XVII with only a slight tint evident in large masses of the masses of the fiber which is in contrast to the marked color resulting when Example XVII is repeated in the absence of the ion exchange resin throughout its entire polymerization cycle.

EXAMPLE XIX

To a tube, 2″ I.D. and 3 feet long, filled with a mixture of glass beads of 0.2 mm. and Dowex 50 ion exchange resin beads 0.15 mm. diameter in a weight ratio of 95:5, and equipped with thermostatic means for maintaining the temperature at 50° C., an inlet pump and port, and outlet port and outlet pump, is swept out with deoxygenated nitrogen and then continuously fed with a deoxygenated solution in which the ratio of components is

| | Parts |
|---|---|
| Dimethyl formamide | 6500 |
| Acrylonitrile | 3290 |
| Ethyl methacrylate | 210 |
| Sodium styrene sulfonate | 25 |
| 2,2'-azobisisobutyronitrile | 40 | at a rate so that the residence time is 12 hours resulting in a polymer solution with a conversion of 60% and a molecular weight of 76,800 at the outlet port from which the solution is transferred by means of the outlet pump through a filter into a flash evaporator, maintained at 50–55° C. and 115–130 mm. which removes unreacted monomer, accumulating a polymer solution similar to that of Example XVII from which fibers and films are spun continuously.

EXAMPLE XX

The procedure of Example IIB is repeated under pressure of 120–130 p.s.i. at 50° C. using 35 parts of monomer mixture with the following monomer compositions in percent by weight:

| Polymer | Acrylonitrile, percent | Vinyl chloride, percent |
|---|---|---|
| A | 99.9 | 0.1 |
| B | 97.5 | 2.5 |
| C | 95.0 | 5.0 |
| D | 90.0 | 10.0 |
| E | 80.0 | 20.0 | and colorless solutions are obtained in all cases from which fiber of excellent quality can be spun by either dry or wet spinning.

EXAMPLE XXI

The procedure of Example XX is repeated using the following monomer composition:

| Polymer | Acrylonitrile, percent | Vinyl chloride, percent | Methacrylonitrile, percent |
|---|---|---|---|
| A | 92 | 5 | 3 |
| B | 87 | 10 | 3 |
| C | 82 | 15 | 3 |
| D | 77 | 20 | 3 |
| E | 67 | 20 | 13 | and colorless solutions eminently suitable for the preparation of films and fibers are obtained.

Generally, polymers containing at least 80% acrylonitrile are considered as suitable for the preparation of fibers of suitable physical properties and solvent resistance. As generally now well-known, the solvent resistance of copolymers that contain one or more monomer units in addition to those formed by the acrylonitrile is affected by the type and proportion of copolymerizing monomer or monomers used to replace part of the acrylonitrile. For example, copolymers can contain various proportions of such monomer units as obtained from vinylidene chloride, methacrylonitrile, fumaronitrile, and betacyano methyl acrylate, without considerable reduction in solvent resistance.

Replacement of acrylonitrile units in the copolymers by vinyl chloride, styrene and alpha-methyl-styrene units results in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile copolymer will decrease much more when one or more monomers have relatively weak secondary bonding forces, such as styrene or ethylene is used to replace part of the acrylonitrile than when one or more monomers having relatively strong bonding forces, such as methacrylonitrile, fumaronitrile, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

In the field of high polymers, molecular orientation is usually indicated and identified by birefringence or polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few highlights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Many of the acrylonitrile copolymers of this invention can be molecularly oriented, especially if there is no more than 20 percent of another monomer or mixture of monomers in the copolymer molecule. This is true when the major portion of the copolymer is acrylonitrile, for example, 80 percent or more acrylonitrile, or when the other copolymerizing monomers used in making such copolymers have substituent groups, having secondary-valence bonding forces equal to or greater than exhibited by the cyano group in acrylonitrile. For example, if such monomers as methacrylonitrile, fumaronitrile, vinylidene chloride, and methyl beta-cyano-acrylate are used with acrylonitrile, the proportion of acrylonitrile in the copolymers can be much less than 80 percent without destroying the capacity for molecular orientation.

Accordingly, many molecularly oriented, cold-drawn, shaped articles of particular usefulness are prepared from copolymer compositions containing in the polymer molecules about only 60 percent acrylonitrile, with or without one or more monomers of the class consisting of vinylidene chloride, vinyl chloride, styrene, alpha-methyl styrene, methacrylonitrile, fumaronitrile, beta-cyano-dimethyl-acrylamide, and methyl beta-cyano-acrylate, etc.

EXAMPLE XXII

The procedure of Example IIB is repeated using 35 parts of monomer mixture with the following composition in percent by weight:

| Polymer | Acrylonitrile, percent | Styrene, percent | Fumaryl Nitrile, percent |
|---|---|---|---|
| A | 88 | 7 | 5 |
| B | 78 | 17 | 5 |
| C | 68 | 27 | 5 |
| D | 60 | 35 | 5 | and clear colorless solutions are obtained from which fibers and films are obtained, which can be molecularly oriented by cold-drawing.

In place of styrene, various styrene derivatives can be used, such as alpha-methyl styrene; nuclear-substituted chloro-styrenes, i.e., ortho-, meta-, and para-chloro-styrenes, dichloro-styrenes, for example, the 2,3-, 2,4-, 2,5-, 2,6-, 3,4-, and 3,5-dichloro-styrenes, trichloro-styrenes, cyano-styrenes, such as ortho-, meta-, and para-cyano-styrenes, dicyano-styrenes; nuclear-substituted alkyl-styrenes, such as mono- and di-methyl-styrenes, mono- and diethyl styrenes, mono- and di-isopropyl styrenes; aryl-substituted styrenes, i.e., para-phenyl-styrene, etc., cyclo-aliphatic-substituted styrenes, such as para-cyclohexyl-styrene; fluoro-styrenes such as ortho-, meta-, para-fluoro-styrene, difluoro-styrenes, etc.; trifluoro-methyl-styrene, such as ortho-, meta-, and para-trifluoromethyl-styrenes, di(trifluoromethyl)-styrenes, and various other styrenes or mixtures of any number of these with each other or with styrene.

EXAMPLE XXIII

The procedure of Example II is repeated with similar excellent results using in place of the Dowex 50 ion exchange resin equivalent amounts respectively of:

(a) A sulfonated phenol-formaldehyde resin;
(b) A formaldehyde resin condensation product of a triazine compound of the formula

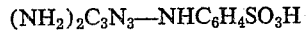

(c) A divinyl benzene crosslinked copolymer of vinyl sulfonic acid; and
(d) A divinyl benzene crosslinked copolymer of vinyl benzylsulfonic acid.

Very small amounts of the ion exchange resins are effective in the practice of this invention, with at least 0.1 part of ion exchange resin per 100 parts of solution being most practical. Since excessive proportions of resin do not have any adverse effects there is no upper limit on the proportion of resin except as determined by practical limitations. When solutions are runthrough fixed beds of such resin in the practice of this invention the ratio of resin to solution can be very high.

While the present invention is particularly advantageous in the preparation of polymers having at least 60 percent of acrylonitrile, especially so with those having 80 percent or more acrylonitrile, because of the solubility and gelation problems, it has also been found that the practice of this invention has advantages, e.g., in avoiding color formation with acrylonitrile copolymers having as little as 25 percent acrylonitrile.

While such copolymers having these low proportions of acrylonitrile, e.g., 25–30%, can be prepared with little or no color by the use of sulfuric acid, subsequent heat treatment of the resultant polymers causes discoloration. However, this subsequent discoloration is avoided when these copolymers are prepared in the presence of cation exchange resins as described herein.

While certain features of this invention have been described in detail with respect to various embodiments thereof, it will, of course, be apparent that other modifications can be made within the spirit and scope of the invention, and it is not intended to limit the invention to the exact details shown above, except insofar as they are defined in the following claims:

The invention claimed is:

1. A process for the free radical solution polymerization of acrylonitrile to solid polymers color stable at 150° C. comprising the step of polymerizing at a temperature of 30–60° C. a monomer portion containing at least 60 percent by weight of acrylonitrile therein, said monomer portion comprising 25–50% by weight of the combined monomer-solvent dissolved in an organic solvent capable of dissolving acrylonitrile polymers containing at least 60 percent by weight of acrylonitrile in the polymer molecule thereof, in the presence of at least about 0.1 part by weight to 100 parts by weight of solution an insoluble, isolable, infusible ion-exchange resin having at least 0.1% by weight of free —$SO_3H$ groups therein to a conversion of at least 10 percent by weight of the monomer to polymer and before reaching gelation, and thereafter separating the ion-exchange resin from the resultant polymer solution.

2. The process of claim 1 in which said monomer proportion contains at least 80 percent by weight acrylonitrile and said solvent is capable of dissolving polymers having at least 80 percent by weight of acrylonitrile in the polymer molecule thereof.

3. The process of claim 2 in which the monomer solution contains 26–35% by weight of monomer based on the total weight of monomers and solvent.

4. The process of claim 3 in which the polymerization is conducted within the temperature range of 40 to 50° C.

5. The process of claim 4 in which said ion-exchange resin has at least 1% by weight of free —$SO_3H$ groups therein.

6. The process of claim 5 in which the polymerization is performed in the presence of a free radical generating catalyst.

7. The process of claim 6 in which the solvent is dimethyl formamide.

8. The process of claim 6 in which the solvent is dimethyl acetamide.

9. The process of claim 6 in which the solvent is dimethyl sulfoxide.

10. The process of claim 7 in which the free radical generating catalyst is 2,2'-azobisisobutyronitrile.

References Cited

UNITED STATES PATENTS 2,794,793   6/1957   Coover _____ 260—88.7

FOREIGN PATENTS 871,279   6/1961   Great Britain.

JOSEPH L. SCHOFER, *Primary Examiner.*

HARRY WONG, Jr., *Assistant Examiner.*